US012732243B2

(12) United States Patent
Svendsen et al.

(10) Patent No.: US 12,732,243 B2
(45) Date of Patent: Sep. 8, 2026

(54) APPARATUS, METHOD, COMPUTER PROGRAM FOR CALIBRATING AN ARRAY OF DUAL-POLARIZED ANTENNA ELEMENTS

(71) Applicant: NOKIA TECHNOLOGIES OY, Espoo (FI)

(72) Inventors: Simon Svendsen, Aalborg (DK); Stig Blücher Brink, Aalborg (DK); Poul Olesen, St 526 vring (DK); Morten Toft, Svenstrup (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 568 days.

(21) Appl. No.: 18/154,403

(22) Filed: Jan. 13, 2023

(65) Prior Publication Data

US 2023/0224001 A1 Jul. 13, 2023

(30) Foreign Application Priority Data

Jan. 13, 2022 (EP) .................................... 22151327

(51) Int. Cl.
*H04B 7/06* (2006.01)
*H01Q 3/28* (2006.01)
(Continued)

(52) U.S. Cl.
CPC ............. *H04B 7/0617* (2013.01); *H01Q 3/28* (2013.01); *H01Q 3/36* (2013.01); *H01Q 9/0407* (2013.01)

(58) Field of Classification Search
CPC .. H01Q 9/0407; H01Q 3/267; H01Q 21/0006; H01Q 23/00; H01Q 3/36–38;
(Continued)

(56) References Cited

U.S. PATENT DOCUMENTS

2004/0032365 A1 2/2004 Gottl et al.
2012/0189078 A1 7/2012 Eom et al.
(Continued)

FOREIGN PATENT DOCUMENTS

CN 105940552 A 9/2016
CN 112088499 A 12/2020
(Continued)

OTHER PUBLICATIONS

"3rd Generation Partnership Project; Technical Specification Group Radio Access Network; NR; Physical layer procedures for data (Release 16)", 3GPP TS 38.214 v16.11.0, (Sep. 2022), 175 pages.
(Continued)

*Primary Examiner* — Vladimir Magloire
*Assistant Examiner* — Remash R Guyah
(74) *Attorney, Agent, or Firm* — ALSTON & BIRD LLP

(57) ABSTRACT

An apparatus including an array of dual-polarized antenna elements. Each antenna element includes a pair of orthogonal polarization feeds, and a coupler configured to couple, in the near field, the orthogonal polarizations. The apparatus also including control circuitry configured to control, for each polarization, for each antenna element, a power adjustment and a phase adjustment applied to signals of the respective polarization feeds. The apparatus further includes measurement circuitry configured to measure, for each polarization, for each antenna element via its respective coupler, a power and/or a phase of a signal transmitted from the respective array. The apparatus also includes calibration circuitry configured to adjust, for each polarization, for each antenna element, the power adjustment and/or the phase adjustment applied to signals of the respective polarization feeds in dependence upon the measurement, for each polarization, of power and/or phase of the signal transmitted from the respective antenna element.

20 Claims, 5 Drawing Sheets

(51) Int. Cl.
*H01Q 3/36* (2006.01)
*H01Q 9/04* (2006.01)

(58) Field of Classification Search
CPC ......... H01Q 21/24–28; H01Q 1/22–24; H01Q 3/26–46; H01Q 9/04–0492; H01Q 21/00–29; H01Q 25/00–04; H04B 17/18; H04B 7/0404; H04B 7/088; H04B 7/10; H04B 7/06–0617; H04B 17/12–14; H04B 17/20–21; H04B 7/0408–0897; H04B 1/10–7172; H04L 5/0048–0073; H04K 3/00–94; G01R 29/08–10
USPC .......... 342/368–377; 343/700 MS, 850, 853; 455/67.11, 67.14, 115.1–115.4, 455/226.1–226.4, 562.1, 63.4, 65, 68, 69, 455/126
See application file for complete search history.

(56) References Cited

U.S. PATENT DOCUMENTS

| | | | |
|---|---|---|---|
| 2016/0049995 | A1 | 2/2016 | Deane et al. |
| 2016/0191176 | A1 | 6/2016 | O'Keeffe et al. |
| 2018/0254839 | A1 | 9/2018 | Yuan et al. |
| 2020/0014105 | A1 | 1/2020 | Braun et al. |
| 2020/0127387 | A1 | 4/2020 | Park et al. |
| 2021/0076370 | A1 | 3/2021 | Bengtsson et al. |
| 2021/0384624 | A1* | 12/2021 | Abdalla ............... H01Q 21/061 |
| 2021/0399774 | A1 | 12/2021 | Rafique |
| 2022/0279535 | A1* | 9/2022 | Tsui .................... H04L 25/0222 |
| 2023/0352838 | A1 | 11/2023 | Svendsen et al. |

FOREIGN PATENT DOCUMENTS

| | | | |
|---|---|---|---|
| EP | 3 920 333 | A1 | 12/2021 |
| WO | WO 2020/123829 | A1 | 6/2020 |

OTHER PUBLICATIONS

"3rd Generation Partnership Project; Technical Specification Group Radio Access Network; NR; User Equipment (UE) radio transmission and reception; Part 2: Range 2 Standalone (Release 17)", 3GPP TS 38.101-2 v17.3.0, (Sep. 2021), 186 pages.

"3rd Generation Partnership Project; Technical Specification Group Radio Access Network; Study on New Radio Access Technology Physical Layer Aspects (Release 14)", 3GPP TR 38.802 v14.2.0, (Sep. 2017), 145 pages.

Alessandri et al., "Enhanced Dual Polarization Directional Coupler for Dual Polarization Beam Forming Networks", 2000 IEEE MTT-S International Microwave Symposium Digest (Cat. No. 00CH37017), (Aug. 6, 2002), 4 pages.

Extended European Search Report for European Application No. 22151327.8 dated Jul. 4, 2022, 9 pages.

Khalil et al., "2.1 mm-Wave 5G Radios: Baseband to Waves", 2021 IEEE International Solid-State Circuits Conference (ISSCC), (Mar. 3, 2021), 3 pages.

Lebron et al., "Validation and Testing of Initial and In-Situ Mutual Coupling-Based Calibration of a Dual-Polarized Active Phased Array Antenna", IEEE Access, vol. 8, (Mar. 26, 2020), 14 pages.

Lin et al., "Bandwidth and Gain Enhancement of Patch Antenna Based on Coupling Analysis of Characteristic Modes", IEEE Transactions on Antennas and Propagation, vol. 68, Issue 11, (May 25, 2020), 12 pages.

Office Action for European Application No. 22151327.8 dated Jul. 22, 2025, 4 pages.

Office Action for Chinese Application No. 2023100539808.X dated Jul. 30, 2025, 22 pages.

Office Action for Chinese Application No. 202310039808.X dated Jan. 28, 2026, 8 pages.

* cited by examiner

APPARATUS, METHOD, COMPUTER PROGRAM FOR CALIBRATING AN ARRAY OF DUAL-POLARIZED ANTENNA ELEMENTS

CROSS-REFERENCE TO RELATED APPLICATIONS

This application claims priority to European Patent Application No. 22151327.8, filed Jan. 13, 2022, the entire contents of which are incorporated herein by reference.

TECHNOLOGICAL FIELD

Embodiments of the present disclosure relate to apparatus, method, computer program for calibrating an array of dual-polarized antenna elements.

BACKGROUND

An array of antenna elements can be used in a controlled manner so that it has strong directionally dependent gain, so called, beam-forming.

Control circuitry controls, for each antenna element, a power adjustment and/or a phase adjustment applied to signals of the respective antenna element.

The power adjustment and/or phase adjustment can be performed in the digital domain, for example using a programmed digital signal processor, or in the analogue domain using hardware.

Where the antenna elements have dual polarization, then they can be used in a controlled manner so that it has strong directionally dependent gain, so called, beam-forming.

It will be appreciated that the directionality of the gain (the beam size and direction) is sensitive to an assumed known fixed phase relationship between the antenna elements and the power adjustments and the phase adjustments based on that fixed relationship.

BRIEF SUMMARY

The phase relationship between the antenna elements can however vary, for example, between different apparatus and/or in dependence upon use. The individual calibration of each apparatus at production is expensive. It would be desirable to provide a form of in-use calibration.

According to various, but not necessarily all, embodiments there is provided an apparatus comprising:

an array of dual-polarized antenna elements wherein each dual-polarized antenna element comprises a pair of orthogonal polarization feeds, and a coupler configured to couple, in the near field, the orthogonal polarizations;

control circuitry configured to control, for each polarization, for each dual-polarized antenna element, a power adjustment and/or a phase adjustment applied to signals of the respective polarization feeds of the respective dual-polarized antenna element;

measurement circuitry configured to measure, for each polarization, for each dual-polarized antenna element via its respective coupler, a power and/or a phase of a signal transmitted from the respective dual-polarized antenna array;

calibration circuitry configured to calibrate the control circuitry, wherein the calibration circuitry is configured to adjust, for each polarization, for each dual-polarized antenna element, the power adjustment and/or the phase adjustment applied to signals of the respective polarization feeds of the respective dual-polarized antenna element in dependence upon the measurement, for each polarization, of power and/or phase of the signal transmitted from the respective dual-polarized antenna element.

In some, but not necessarily all examples, the control circuitry, the measurement circuitry and the calibration circuitry form a closed control loop configured to calibrate dual-polarized beam formation using the array of dual-polarized antenna elements.

In some, but not necessarily all examples, the control circuitry is configured to control, for each polarization, for each dual-polarized antenna element, a power adjustment and/or a phase adjustment applied to the respective polarization feeds of the respective dual-polarized antenna element to control a first direction of a beam formed by the array; and wherein the calibration circuitry is configured to adjust, for each polarization, for each dual-polarized antenna element, the power adjustment and/or the phase adjustment associated with the respective dual-polarized antenna element for forming a beam in the first direction.

In some, but not necessarily all examples, the control circuitry is configured to control, for each polarization, for each dual-polarized antenna element, a power adjustment and/or a phase adjustment applied to the respective polarization feeds of the respective dual-polarized antenna element to control a first direction of a beam formed by the array; and wherein the calibration circuitry is configured to adjust, for each polarization, for each dual-polarized antenna element, the power adjustment and/or the phase adjustment associated with the respective dual-polarized antenna element for forming a beam in a second direction different to the first direction.

In some, but not necessarily all examples, the calibration circuitry configured to calibrate the control circuitry is configured to adjust, for each polarization, for each dual-polarized antenna element, the power adjustment and/or the phase adjustment associated with the respective dual-polarized antenna element to control a direction of an uplink beam of the array.

In some, but not necessarily all examples, the calibration circuitry configured to determine and store parameters used to calibrate the control circuitry to adjust, for each polarization, for each dual-polarized antenna element, the power adjustment and/or the phase adjustment associated with the respective dual-polarized antenna element to control a direction of an uplink beam of the array, wherein the stored parameters are used to calibrate the control circuitry to adjust, for each polarization, for each dual-polarized antenna element, the power adjustment and/or the phase adjustment associated with the respective dual-polarized antenna element to control a direction of a downlink beam of the array.

In some, but not necessarily all examples, the pair of orthogonal polarization feeds have reflection symmetry in a virtual line and wherein the coupler is positioned on the virtual line.

In some, but not necessarily all examples, each dual-polarized antenna element comprises a single coupler connected to the measurement circuitry by a single shared conductive path.

In some, but not necessarily all examples, the signal comprises orthogonal signals applied to respective polarization feeds of respective dual-polarized antenna elements or the signal is a sounding reference signal.

In some, but not necessarily all examples, the measurement circuitry is configured to measure synchronously, for each polarization, for each dual-polarized antenna element via its respective coupler, a power and/or a phase of the signal transmitted from the respective dual-polarized antenna element.

In some, but not necessarily all examples, the measurement circuitry is configured to measure asynchronously, for each used polarization, for each dual-polarized antenna element via its respective coupler, a power and/or a phase of the signal transmitted from the respective dual-polarized antenna element.

In some, but not necessarily all examples, the signal comprises time-separated signals applied to respective polarization feeds of respective dual-polarized antenna elements.

In some, but not necessarily all examples, the calibration circuitry is configured to

- determine a delta phase value for each dual-polarized antenna element, for each respective polarization, the calibration circuitry being configured to compare:
- an expected phase of the signal transmitted via the respective polarization feed
- with
- a measured phase of the signal transmitted via the respective polarization feed, wherein the
- expected phase of the signal transmitted via the respective polarization feed depends on the phase adjustment applied to the signal transmitted via the respective polarization feed;
- being configured to cause compensation for at least the largest delta phase value.

According to various, but not necessarily all, embodiments there is provided a computer program that when run on one or more processors causes:

adjusting, for each polarization, for each dual-polarized antenna element in an array, a power adjustment and/or the phase adjustment applied to signals of the respective polarization feeds of respective dual-polarized antenna elements in dependence upon a coupler measurement, for each polarization, of power and/or phase of the signal transmitted from the respective dual-polarized antenna element.

According to various, but not necessarily all, embodiments there is provided a method for transmitting or receiving dual polarized signals using dual-polarized antenna elements of an array of dual-polarized antenna element comprising:

- for each polarization, of each dual-polarized antenna element of an array of dual-polarized antenna element:
- transmitting a signal;
- measuring via a coupler of the respective dual-polarized antenna element a power and/or a phase of the transmitted signal;
- transmitting or receiving a signal of the respective polarization of the respective dual-polarized antenna element using a power adjustment and/or a phase adjustment adjusted in dependence upon at least the transmitting coupler measurement.

According to various, but not necessarily all, embodiments there is provided an

- apparatus comprising:
- an array of dual-polarized antenna elements wherein each dual-polarized antenna element comprises
- a pair of orthogonal polarization feeds, and
- a coupler configured to couple, in the near field, the orthogonal polarizations;
- control circuitry configured to control, for each polarization, for each dual-polarized antenna element, a power adjustment and a phase adjustment applied to signals of the respective polarization feeds of the respective dual-polarized antenna element;
- measurement circuitry configured to measure, for each polarization, for each dual-polarized antenna element via its respective coupler, a power and/or a phase of a signal transmitted from the respective dual-polarized antenna array;
- calibration circuitry configured to calibrate the control circuitry, wherein the calibration circuitry is configured to adjust, for each polarization, for each dual-polarized antenna element, the power adjustment and/or the phase adjustment applied to signals of the respective polarization feeds of the respective dual-polarized antenna element in dependence upon the measurement, for each polarization, of power and/or phase of the signal transmitted from the respective dual-polarized antenna element.

According to various, but not necessarily all, embodiments there is provided examples as claimed in the appended claims.

BRIEF DESCRIPTION

Some examples will now be described with reference to the accompanying drawings in which.

DETAILED DESCRIPTION

Figure 1:
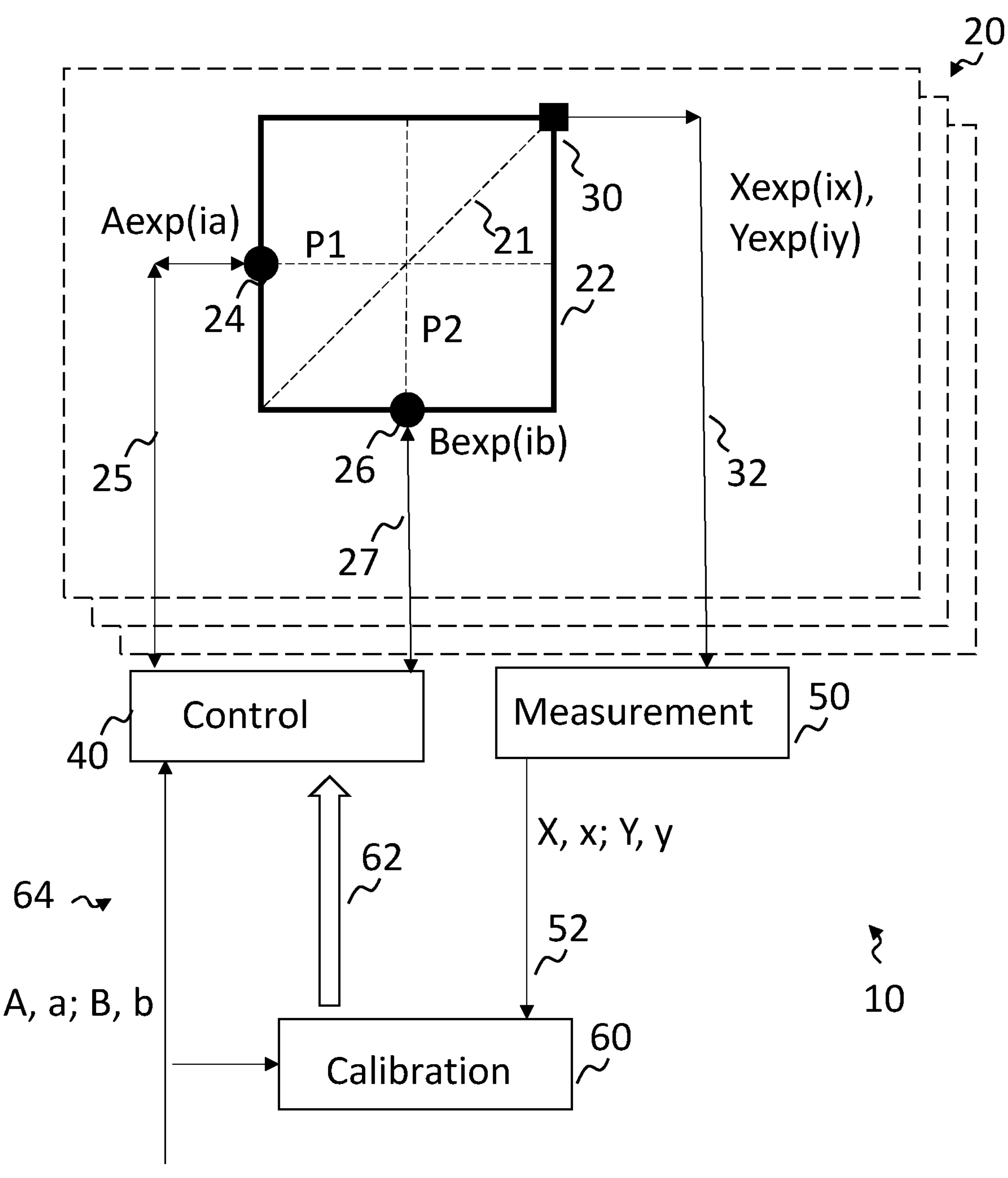
FIG. 1 shows an example of the subject matter described herein.
Figure 2:
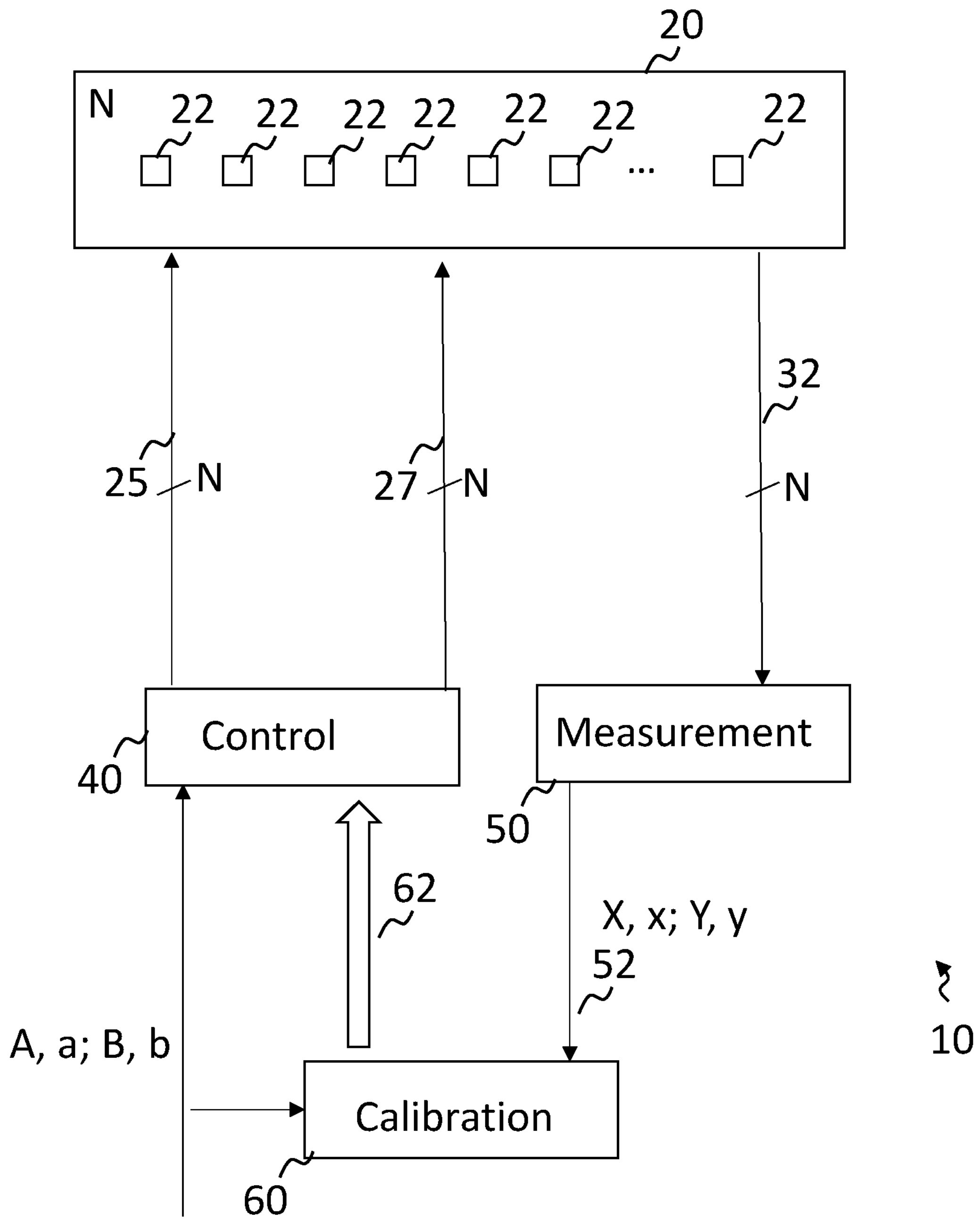
FIG. 2 shows another example of the subject matter described herein.

FIG. 1 illustrates an example of an apparatus 10 configured for radio communications using an array 20 of dual-polarized antenna elements 22. FIG. 2 also illustrates an example of an apparatus 10 configured for radio communications using an array 20 of dual-polarized antenna elements 22.

FIG. 1 illustrates in detail a dual-polarized antenna element 22 and the control circuitry 40, measurement circuitry 50 and calibration circuitry 60 associated with the dual-polarized antenna element 22. FIG. 2 illustrates the array 20 of dual-polarized antenna elements 22 and the control circuitry 40, measurement circuitry 50 and calibration circuitry 60 associated with the array of dual-polarized antenna elements 22.

The apparatus 10 comprises the array 20 of dual-polarized antenna elements 22. Each dual-polarized antenna element 22 comprises a pair of polarization feeds 24, 26 and a coupler 30 configured to couple, in the near field, the orthogonal polarizations P1, P2. The pair of polarization feeds 24, 26 can be for orthogonal polarizations (orthogonal-polarization feeds). The pair of polarization feeds 24, 26 are different in configuration and in at least some examples are physically aligned at 90 degrees to each other or at close to 90 degrees to each other.

The coupler 30 can be configured to have a different size and or distance to the antenna element 22. In some examples, the couplers 30 of at least some of the antenna elements 22 are configured differently, for example, they have a different size and/or a different distance to the antenna element 22.

The apparatus 10 also comprises control circuitry 40 that is configured to control, for each polarization (P1, P2), for each dual-polarized antenna element 22, a power adjustment (A, B) and a phase adjustment (a, b) applied to signals 25, 27 of the respective polarization feeds 24, 26 of the respective dual-polarized antenna element 22.

The apparatus 10 also comprises measurement circuitry 50 configured to measure, for each polarization (P1, P2), for each dual-polarized antenna element 22 via 32 its respective coupler 30, a power (X, Y) and/or a phase (x, y) of a signal transmitted from the respective dual-polarized antenna array 20.

The apparatus 10 also comprises calibration circuitry 60 configured to calibrate 62 the control circuitry 40. The calibration circuitry 60 is configured to adjust, for each polarization (P1, P2), for each dual-polarized antenna element 22, the power adjustment (A, B) and/or the phase adjustment (a, b) applied to signals 25, 27 of the respective polarization feeds 24, 26 of the respective dual-polarized antenna element 22 in dependence upon the measurement 52, for each polarization (P1, P2), of power (X, Y) and/or phase (x, y) of the signal transmitted from the respective dual-polarized antenna element 22.

Thus, for each pairing of polarization (P1, P2) and dual-polarized antenna element 22 a power (X, Y) and/or a phase (x, y) of a signal transmitted is measured and the measurements are used to adjust the power adjustment (A, B) and/or the phase adjustment (a, b) applied to a signal associated with each respective pairing of polarization and dual-polarized antenna element. In this way the array 20 of dual-polarized antenna elements 22 is calibrated in use.

The measurement of a power (X, Y) and/or a phase (x, y) of a signal transmitted for each pairing of polarization (P1, P2) and dual-polarized antenna element 22 uses a coupler 30 at each dual-polarized antenna element 22 configured to couple, in the near field, the orthogonal polarizations P1, P2.

The use of the terms "each" does not necessarily mean each and every. It means each and every one of some or all. Thus "each dual-polarized antenna element" means "each dual-polarized antenna element of at least some of the dual-polarized antenna elements 22" and the terms are interchangeable.

In some but not necessarily all examples, the array 20 of dual-polarized antenna elements 22 is configured such that each and every dual-polarized antenna element comprises: a pair of orthogonal polarization feeds 24, 26, and a coupler 30 configured to couple symmetrically, in the near field, the orthogonal polarizations.

Thus, each dual-polarized antenna element 22 can comprise a coupler 30 that is used by the measurement circuitry 50 to measure, for each polarization (P1, P2), for each dual-polarized antenna element 22 a power (X, Y) and/or a phase (x, y) of a signal transmitted from the respective dual-polarized antenna array 20. The measurement circuitry 50 can use a shared interconnect 32 to connect to the couplers 30 and measure each coupler 30 sequentially. Alternatively, the measurement circuitry 50 can use separate interconnects 32 to connect to the couplers 30 and measure each coupler 30 in parallel, and for example, simultaneously.

The signal transmitted can be any suitable transmission signal. It is used as a reference signal, in that it has expected parameters (for example power, phase) for the pairs of polarization and antenna elements against which the measured parameters can be compared. The signal transmitted can be a Third Generation Partnership Project (3GPP) allocated Tx signal and not a specific non-3GGP Tx signal. The transmitted signal can, for example, be a, sounding reference signal (SRS), a control signal (for example a signal transmitted on the Physical Uplink Control Channel PUCCH), or a data signal (for example transmitted in the Physical Uplink Shared Channel PUSCH).

The signal 25 is represented in the examples as Aexp(ia) where A is an amplitude (a power-related parameter) and a is phase. The signal 27 is represented in the examples as Bexp(ib) where B is an amplitude (a power-related parameter) and b is phase. The transmitted signal is therefore Aexp(ia) at polarization P1 and Bexp(ib) at polarization P2. The measurement 52 assumes a signal Xexp(ix) at polarization P1 and Yexp(iy) at polarization P2. The parameters of the measurement can therefore be the phases x, y and also, optionally, the amplitudes X, Y.

The apparatus 10 can autonomously configure array 20 beams in use without using over the air calibration in the production line.

It will be appreciated that the control circuitry 40, the measurement circuitry 50 and the calibration circuitry 60 form a closed control loop 64 configured to calibrate dual-polarized beam formation using the array 20 of dual-polarized antenna elements 22.

The closed control loop 64 can operate autonomously providing autonomous beam alignment.

The closed control loop 64 can be used to maintain a dual polarized beam in a particular direction or to change a direction of a dual polarized beam. Thus, the control and measurement can be done for one beam direction and the calibration can be done for the same direction or for a different direction. Also, the control and measurement are performed for a transmitted beam and the calibration can be done for a transmitted beam or for a reception beam.

Thus in at least some examples, the control circuitry 40 is configured to control, for each polarization, for each dual-polarized antenna element, a power adjustment and/or a phase adjustment applied to the respective polarization feeds 24, 26 of the respective dual-polarized antenna element 22 to control a first direction of a beam formed by the array 20 and the calibration circuitry 60 is configured to adjust, for each polarization, for each dual-polarized antenna element, the power adjustment and/or the phase adjustment associated with the respective dual-polarized antenna element for forming a beam in the first direction.

Thus in at least some examples, the control circuitry 40 is configured to control, for each polarization, for each dual-polarized antenna element, a power adjustment and/or a phase adjustment applied to the respective polarization feeds 24, 26 of the respective dual-polarized antenna element 22 to control a first direction of a beam formed by the array 20 and the calibration circuitry 60 is configured to adjust, for each polarization, for each dual-polarized antenna element, the power adjustment and/or the phase adjustment associated with the respective dual-polarized antenna element for forming a beam in a second direction different to the first direction.

Thus in at least some examples, the calibration circuitry 60, configured to calibrate the control circuitry 40, is configured to adjust, for each polarization, for each dual-polarized antenna element 22, the power adjustment and/or the phase adjustment associated with the respective dual-polarized antenna element 22 to control a direction of an uplink beam of the array 20.

Thus in at least some examples, the calibration circuitry 60 is configured to determine and store parameters used to calibrate the control circuitry 40 to adjust, for each polarization, for each dual-polarized antenna element 22, the power adjustment and/or the phase adjustment associated with the respective dual-polarized antenna element to control a direction of an uplink beam of the array 20. The stored parameters can then be used to calibrate the control circuitry 40 to adjust, for each polarization, for each dual-polarized antenna element 22, the power adjustment and/or the phase adjustment associated with the respective dual-polarized antenna element to control a direction of a downlink beam of the array 20. The reception beam configuration can thus be equal to the transmission beam configuration.

The pair of orthogonal polarization feeds 24, 26 comprise a CoPolar (P1) feed 24 and a CrossPolar (P2) feed 26. The pair of orthogonal polarization feeds 24, 26 have reflection symmetry in a virtual line 21 and the coupler 30 is positioned on the virtual line 21.

Although the antenna element 22 is illustrated as a square in FIG. 1, it should be appreciated that it can have a different shape and configuration. Any suitable antenna element 22 can be used. For example, it could be circular. In some but not necessarily all examples, the antenna element comprises a conductive patch or patches. In some but not necessarily all examples, the conductive patch or patches can have reflection symmetry in the virtual line 21. The antenna elements 22 in the array 20 can have the same shape, can have a limited number of different shapes hat are re-used or can have different shapes.

In some but not necessarily all examples, each dual-polarized antenna element 22 comprises a single coupler 30 connected to the measurement circuitry 50 by a single conductive path. The near-field single coupler 30 is physically located very close to an antenna element 22 for "sniffing" radio frequencies.

The transmitted signal can comprise orthogonal signals applied to respective polarization feeds 24, 26 of respective dual-polarized antenna elements 22.

For example, the transmitted signal can be a Zadoff-Chu Sequence signal like a Primary Synchronization Signal (PSS) or a Sounding Reference Signal SRS as specified by the Third Generation Partnership Project (3GPP).

In some but not necessarily all examples, the measurement circuitry 50 is configured to measure synchronously, for each polarization (P1, P2), for each dual-polarized antenna element 22 via 32 its respective coupler 30, a power (X, Y) and/or a phase (x, y) of the signal transmitted from the respective dual-polarized antenna element 22. Thus, there can be simultaneous compensation on both polarizations using orthogonal reference signals.

Phase synchronisation can be achieved by changing the absolute phase for one polarization, while keeping the relative phase differences between the antenna elements 22. It's the relative phase differences that is important for the angular beam direction.

In some but not necessarily all examples, the measurement circuitry 50 is configured to measure asynchronously, for each polarization (P1, P2), for each dual-polarized antenna element via 32 its respective coupler 30, a power (X, Y) and/or a phase (x, y) of the signal transmitted from the respective dual-polarized antenna element 22.

In this example, the transmitted signal comprises time-separated signals applied to respective polarization feeds 24, 26 of respective dual-polarized antenna elements 22.

Figure 3:
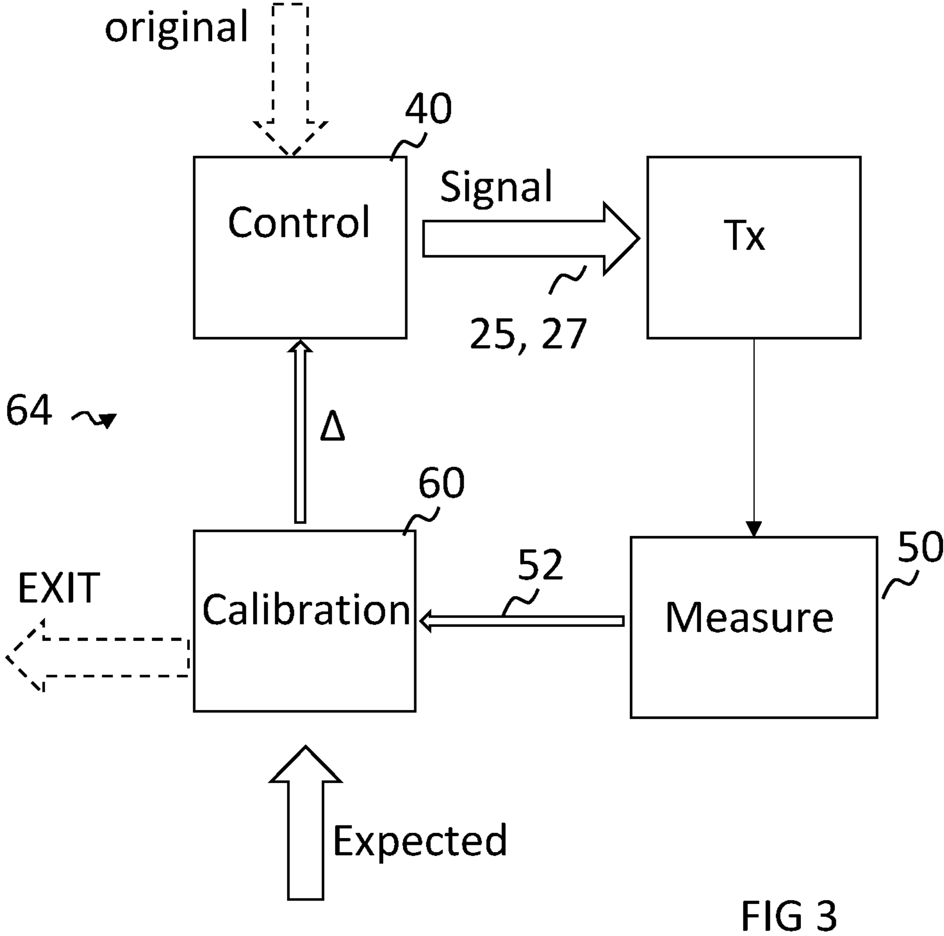
FIG. 3 shows another example of the subject matter described herein.

FIG. 3 illustrates an example of operation of the control loop 64.

Control circuitry 40 is configured to control, for each polarization (P1, P2), for each dual-polarized antenna element 22, a power adjustment and/or a phase adjustment applied to signals 25, 27 of the respective polarization feeds 24, 26 of the respective dual-polarized antenna elements 22.

The measurement circuitry 50 is configured to measure, for each polarization (P1, P2), for each dual-polarized antenna element 22 via its respective coupler 30, a power and/or a phase of a signal transmitted from the respective dual-polarized antenna array 20. The measurement 52 is provided to the calibration circuitry 60.

The calibration circuitry 60 is configured to calibrate the control circuitry 40. The calibration circuitry 60 is configured to adjust, for each polarization (P1, P2), for each dual-polarized antenna element 22, the power adjustment and/or the phase adjustment applied to signals 25, 27 of the respective polarization feeds 24, 26 of the respective dual-polarized antenna elements 22 in dependence upon the measurement 52, for each polarization (P1, P2), of power and/or phase of the signal transmitted from the respective dual-polarized antenna element 22.

In this example, an original signal 25, 27 has expected power and phase values at the various antenna elements 22, at transmission. The measured power and phase value 52 are compared with the expected values at the calibration circuitry 60. In this example, a delta value(s) is provided by the calibration circuitry 60 to the control circuitry 40. The delta value informs the control circuitry 40 how to adjust the original signal 25, 27 such that the measured power and phase at transmission is more similar to the expected values of power and transmission for a particular beam direction.

The control loop 64 can iterate to continually improve the similarity of the measured power and phase at transmission to the expected values of power and transmission for a particular beam direction. The loop can exit when the difference between the measured power and phase at transmission and the expected values of power and transmission for a particular beam direction that is determined by the calibration circuitry 60 is less than a threshold value.

The control loop 64 can also or alternatively iterate to maintain a similarity of the measured power and phase at transmission to expected values of power and transmission for a particular beam direction.

The phase adjustment applied to the signal 25, 27 transmitted via the respective polarization feed 24, 26 can therefore be the delta value ($\Delta_a$, $\Delta_b$) or the accumulated delta values accumulated over iterations ($\sigma\Delta_a$, $\Sigma\Delta_b$).

The original signal 25 will generate an expected near-field coupled signal to the coupler 30. Thus, if the original signal 25 is A exp(ia) for the polarization P1, then the expected measurement should be U exp(iu) which is compared to the actual measurement X exp(ix). The comparison at the calibration circuitry 60 creates a phase delta $\Delta_a$=x−u. The control circuitry 40 adjusts the phase of the signal 25 such that the signal 25 becomes A exp (i[a+$\Delta_a$]). The comparison at the calibration circuitry 60 can also create an amplitude delta $\Delta_A$=X−U. The control circuitry adjusts the amplitude of the signal 25 such that the signal 25 becomes (A+$\Delta_x$)exp (i[a+$\Delta_x$]).

Thus, if the original signal 27 is B exp(ib) for the polarization P2, then the expected measurement should be V exp(iv) which is compared to the actual measurement Y exp(iy). The comparison at the calibration circuitry 60 creates a phase delta $\Delta_b$=y−v. The control circuitry 40 adjusts the phase of the signal 27 such that the signal 27 becomes B exp(i[b+$\Delta_b$]). The comparison at the calibration circuitry 60 can also create an amplitude delta $\Delta_B$=Y−V. The control circuitry adjusts the amplitude of the signal 27 such that the signal 27 becomes (B+$\Delta_x$)exp(i[b+$\Delta_b$]).

In some examples, the delta phases ($\Delta_a$, $\Delta_b$) are determined for each antenna element 22. Optionally, the delta amplitudes ($\Delta_A$, $\Delta_B$) are determined for each antenna element 22.

In some examples, the delta phases ($\Delta_a$, $\Delta_b$) are determined for one antenna element 22 and re-used on other antenna elements 22. Optionally, the delta amplitudes ($\Delta_A$, $\Delta_B$) are determined for one antenna element (for example the same antenna element) and re-used for other antenna elements 22. In some examples, the maximum delta phases (MAX[$\Delta_a$], MAX[$\Delta_b$]) can be re-used on other antenna elements 22. The maximum delta phases can be from different antenna elements 22.

The control loop 64 can therefore calibrate phase only, or calibrate phase and amplitude.

The control loop 64 can therefore calibrate phase and amplitude separately or can calibrate phase and amplitude simultaneously.

In some but not necessarily all examples, the calibration circuitry 60 is configured to determine a delta phase value for each dual-polarized antenna element 22, for each respective polarization P1, P2, the calibration circuitry 60 being configured to compare: an expected phase (u, v) of the coupled version of the via the respective couplers 30 of the original signal transmitted via the respective polarization feed 24, 26 with a measured phase (x, y) of the signal 25, 27 transmitted via the respective polarization feed 24, 26, wherein the expected phase (u, v) of the signal 24, 27 transmitted via the respective polarization feed 24, 26 depends on the phase adjustment ($\Delta_a$, $\Delta_b$), if any, applied to the signal 25, 27 transmitted via the respective polarization feed 24, 26. The calibration circuitry 60 can be configured to cause compensation for at least the largest delta phase value (MAX[$\Delta_a$], MAX[$\Delta_b$]).

In some but not necessarily all examples, the for example, calibration circuitry 60 is configured to compensate for all delta phase values above a threshold by applying the delta phase value as an offset value to adjust the phase adjustment applied in future to each of the respective signals 25, 27 of the respective polarization feeds 24, 26 of the respective antenna elements 22.

In some but not necessarily all examples, the calibration circuitry 60 is configured to determine a delta power value for each dual-polarized antenna element 22, for each respective polarization P1, P2, the calibration circuitry 60 being configured to compare: an expected power (U, V) of the coupled version of the via the respective couplers 30 of the original signal 25, 27 transmitted via the respective polarization feed 24, 26 with a measured power (X, Y) of the signal 25, 27 transmitted via the respective polarization feed 24, 26, wherein the expected power (U, V) of the signal 24, 27 transmitted via the respective polarization feed 24, 26 depends on the power adjustment ($\Delta_A$, $\Delta_B$), if any, applied to the signal 25, 27 transmitted via the respective polarization feed 24, 26. The calibration circuitry 60 can be configured to cause compensation for at least the largest delta amplitude value (MAX[$\Delta_A$], MAX[$\Delta_B$]).

In some but not necessarily all examples, the adjustment applied by the calibration circuitry 60 is configured to compensate for all delta power values above a threshold by applying the delta amplitude value as an offset value to adjust the power adjustment applied in future to each of the respective signals 25, 27 of the respective polarization feeds 24, 26 of the respective antenna elements 22.

Figure 4:
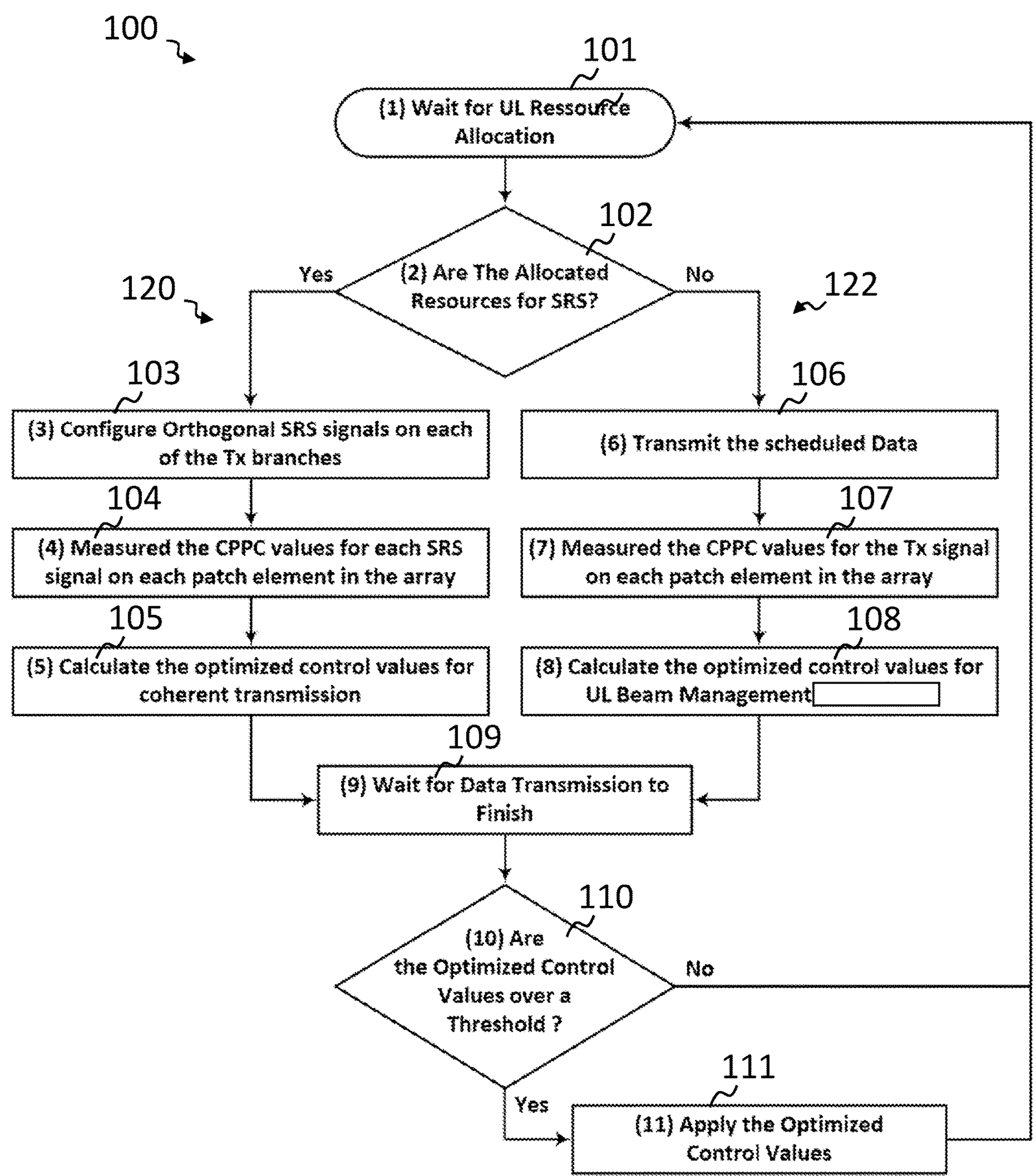
FIG. 4 shows another example of the subject matter described herein.

FIG. 4 illustrates a flow chart of an example of the above-described measurement-calibration-control process.

At block 101, a user equipment (UE) is waiting for scheduled uplink (UL) resources.

At block 102, it is determined whether or not the allocated UL resources are for sounding reference signals (SRS). If yes, the process takes the orthogonal branch 120. If no, the process takes the non-orthogonal branch 122.

The orthogonal branch 120 starts at block 103 where the UE configures orthogonal SRS signals for each of the Tx branches. There is a Tx branch for each polarization.

The control circuitry 40 controls, for each polarization (P1, P2), for each dual-polarized antenna element 22, a power adjustment and/or a phase adjustment, if any, applied to transmitted SRS signals 25, 27 of the respective polarization feeds 24, 26 of the respective dual-polarized antenna element 22.

At block 104, the measurement circuitry 50 measures, for each polarization (P1, P2), for each dual-polarized antenna element 22 via 32 its respective coupler 30, a power and/or a phase of a SRS signal transmitted from the respective dual-polarized antenna array 20.

At block 105, the calibration circuitry 60 calibrates 62 the control circuitry 40 by adjusting, for each polarization (P1, P2), for each dual-polarized antenna element 22, a power adjustment and/or a phase adjustment applied to signals 25, 27 of the respective polarization feeds 24, 26 of the respective dual-polarized antenna element 22 in dependence upon the measurement 52, for each polarization (P1, P2), of power and/or phase of the signal transmitted from the respective dual-polarized antenna element 22. The power adjustment(s) and/or a phase adjustment(s) are optimized for coherent transmission.

The non-orthogonal branch 122 starts at block 106 where the UE Transmits the scheduled UL data, either on a single polarization (P1 or P2) or simultaneously on both polarizations (P1 and P2).

The control circuitry 40 controls, for each used polarization (P1 and/or P2), for each dual-polarized antenna element 22, a power adjustment and/or a phase adjustment, if any, applied to transmitted data signals 25 and/or 27 of the respective polarization feeds 24 and/or 26 of the respective dual-polarized antenna element 22.

At block 107, the measurement circuitry 50 measures, for each polarization (P1 and/or P2), for each dual-polarized antenna element 22 via 32 its respective coupler 30, a power and/or a phase of a Data signal transmitted from the respective dual-polarized antenna array 20. The UE measures a single combined value for each of the antenna elements 22.

In this example, the transmitted signal comprises time-separated signals applied to respective polarization feeds 24, 26 of respective dual-polarized antenna elements 22. Or a combined non-orthogonal signal on both polarizations. The measurements for different polarizations are therefore measured asynchronously.

At block 108, the calibration circuitry 60 calibrates 62 the control circuitry 40 by adjusting, for each used polarization (P1 and/or P2), for each dual-polarized antenna element 22, a power adjustment and/or a phase adjustment (a, b) applied to signals 25 and/or 27 of the respective polarization feeds 24 and/or 26 of the respective dual-polarized antenna element 22 in dependence upon the measurement 52, for each polarization (P1 and/or P2), of power and/or phase of the signal transmitted from the respective dual-polarized antenna element 22.

After the respective branch 120, 122, at step 109, the UE waits for the currently scheduled UL transmission to finish.

At block 110, the UE determines if the optimized control values (power adjustment and/or a phase adjustment are above a pre-determined threshold. If they are not they are not applied. If they are, they are applied.

At block 111, the UE applies the optimized control values (power adjustment and/or a phase adjustment). The control circuitry 40 controls, for each polarization (P1, P2), for at least some of the dual-polarized antenna elements 22, a power adjustment and/or a phase adjustment applied to transmitted SRS signals 25, 27 of the respective polarization feeds 24, 26 of the respective dual-polarized antenna element 22.

Thus, in some but not necessarily all examples, the measurement circuitry 50 is configured 120 to measure synchronously, for each polarization (P1, P2), for each dual-polarized antenna element 22 via 32 its respective coupler 30, a power and/or a phase of the signal transmitted from the respective dual-polarized antenna element 22. Thus, there can be simultaneous compensation on both polarizations using orthogonal reference signals. Phase synchronisation can be achieved by changing the absolute phase for one polarization, while keeping the relative phase differences between the patches. It's the relative phase differences that is important for the angular beam direction.

Thus, in some but not necessarily all examples, the measurement circuitry 50 is configured 122 to measure asynchronously, for each used polarization (P1 and/or P2), for each dual-polarized antenna element via 32 its respective coupler 30, a power and/or a phase of the signal transmitted from the respective dual-polarized antenna element 22. In this example, the transmitted signal can comprise time-separated signals applied to respective polarization feeds 24 and/or 26 (25 and/or 27) of respective dual-polarized antenna elements 22.

Figure 5:
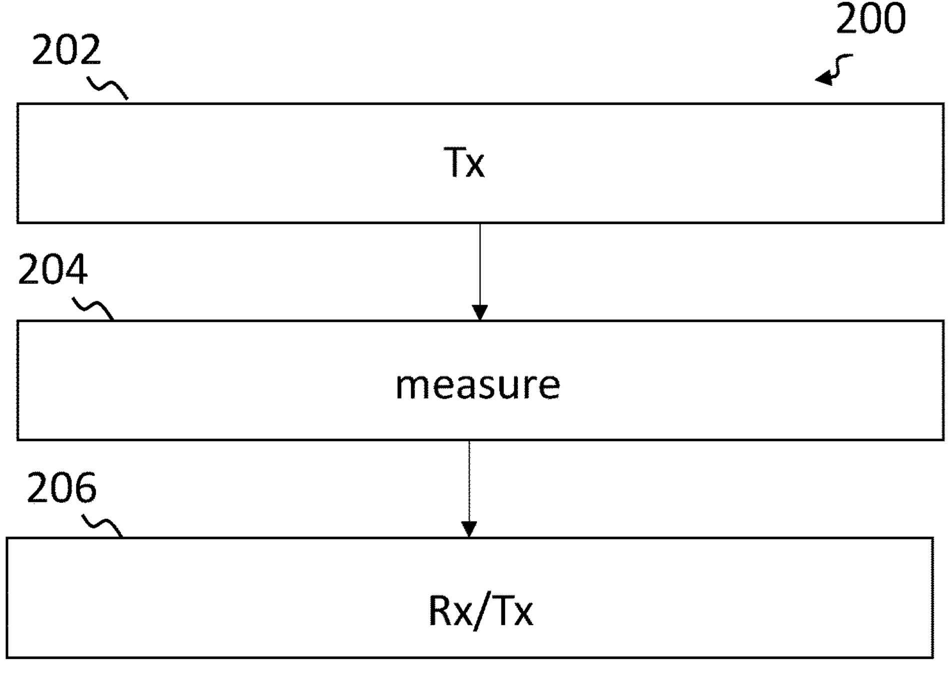
FIG. 5 shows another example of the subject matter described herein.

FIG. 5 illustrates an example of a method 200. In this example the method 200 comprises transmitting or receiving dual polarized signals using calibrated dual-polarized antenna elements 22 of an array 20 of dual-polarized antenna elements 22.

The method 200 comprises a series of blocks for each polarization, of each dual-polarized antenna element 22 of the array 20 of dual-polarized antenna elements 22.

At block 202, the method comprises transmitting a signal 25 and/or 27.

At block 204, the method 200 comprises measuring via a coupler 30 of the respective dual-polarized antenna element 22 a power and/or a phase of the transmitted signal 25 and/or 27.

At block 206, the method 200 comprises transmitting or receiving a signal of the respective polarization 24 and/or 26 of the respective dual-polarized antenna elements 22 using a power adjustment and/or a phase adjustment adjusted in dependence upon at least the coupler measurement 52 during transmission.

Each dual-polarized antenna element 22 comprises a pair of orthogonal polarization feeds 24, 26 and a coupler 30 configured to couple, in the near field, the orthogonal polarizations P1, P2. At block 204, the method 200 measures, for each used polarization (P1 and/or P2), for each dual-polarized antenna element 22 via 32 its respective coupler 30, a power and/or a phase of a signal transmitted from the respective dual-polarized antenna array 20. The method additionally comprises adjusting, for each used polarization (P1 and/or P2), for some or all of the dual-polarized antenna elements 22, a power adjustment and/or a phase adjustment applied to signals 25 and/or 27 of the respective polarization feeds 24 and/or 26 of the respective dual-polarized antenna elements 22 in dependence upon the measurement 52, for each used polarization (P1 and/or P2), of power (X and/or Y) and/or phase (x and/or y) of the signal transmitted from the respective dual-polarized antenna element 22. Then, for each used polarization (P1 and/or P2), for each dual-polarized antenna element 22, the power adjustment (U and/or V) and the phase adjustment are applied to signals 25 and/or 27 of the respective polarization feeds 24 and/or 26 of the respective dual-polarized antenna element 22.

In this way the array 20 of dual-polarized antenna elements 22 is calibrated in use.

Figure 6:
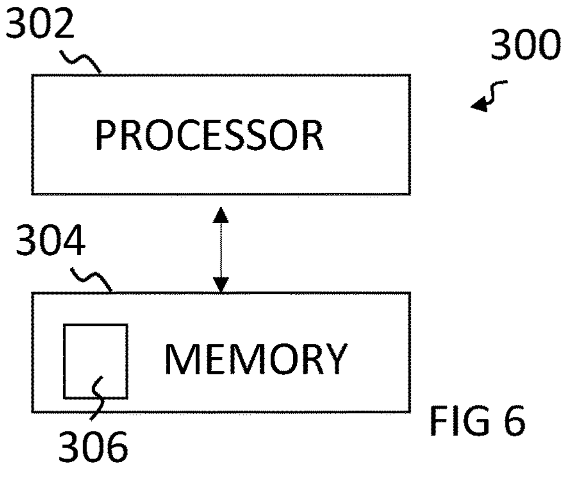
FIG. 6 shows another example of the subject matter described herein.

FIG. 6 illustrates an example of a controller 300 suitable for use in the apparatus 10 for assisting performance of the closed feedback loop 64, and in particular the calibration circuitry 60 and, in some examples, the control circuitry 40. The calibration circuitry 60 in this example is in the digital domain. In some examples the control circuitry 40 is wholly in the digital domain, in other examples the control circuitry 40 is wholly in the analogue domain, and in other examples the control circuitry 40 is partially in the digital domain and partially in the analogue domain.

Implementation of a controller 300 may be as controller circuitry. The controller 300 may be implemented in hardware alone, have certain aspects in software including firmware alone or can be a combination of hardware and software (including firmware).

As illustrated in FIG. 6 the controller 300 may be implemented using instructions that enable hardware functionality, for example, by using executable instructions of a computer program 306 in a general-purpose or special-purpose processor 302 that may be stored on a computer readable storage medium (disk, memory etc) 304 to be executed by such a processor 302.

The processor 302 is configured to read from and write to the memory 304. The processor 302 may also comprise an output interface via which data and/or commands are output by the processor 302 and an input interface via which data and/or commands are input to the processor 302.

The memory 304 stores a computer program 306 comprising computer program instructions (computer program code) that controls the operation of the apparatus 10 when loaded into the processor 302. The computer program instructions, of the computer program 306, provide the logic and routines that enables the apparatus to perform the methods illustrated in the drawings. The processor 302 by reading the memory 304 is able to load and execute the computer program 306.

The apparatus 10 therefore comprises:

at least one processor 302; and at least one memory 304 including computer program code the at least one memory 304 and the computer program code configured to, with the at least one processor 302, cause the apparatus 10 at least to perform:

adjusting, for each polarization (P1, P2), for each dual-polarized antenna element 22 in an array 20, a power adjustment and/or the phase adjustment applied to signals 25, 27 of the respective polarization feeds 24, 26 of respective dual-polarized antenna elements 22 in dependence upon a coupler 30 measurement 52, for each polarization (P1, P2), of power and/or phase of the signal 25, 27 transmitted from the respective dual-polarized antenna element 22.

Figure 7:
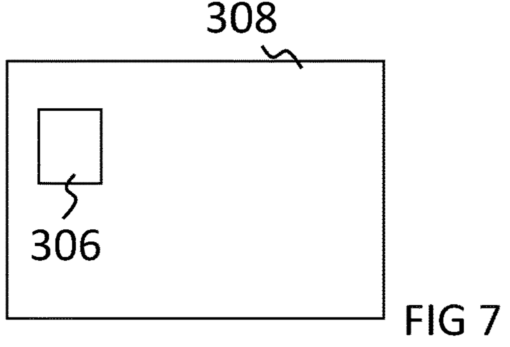
FIG. 7 shows another example of the subject matter described herein.

As illustrated in FIG. 7, the computer program 306 may arrive at the apparatus 10 via any suitable delivery mechanism 308. The delivery mechanism 308 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid-state memory, an article of manufacture that comprises or tangibly embodies the computer program 306. The delivery mechanism may be a signal configured to reliably transfer the computer program 306. The apparatus 10 may propagate or transmit the computer program 306 as a computer data signal.

Computer program instructions for causing an apparatus to perform at least the following or for performing at least the following: adjusting, for each polarization (P1, P2), for each dual-polarized antenna element 22 in an array 20, a power adjustment and/or the phase adjustment applied to signals 25, 27 of the respective polarization feeds 24, 26 of respective dual-polarized antenna elements 22 in dependence upon a coupler 30 measurement 52, for each polarization (P1, P2), of power and/or phase of the signal 25, 27 transmitted from the respective dual-polarized antenna element 22.

The computer program instructions may be comprised in a computer program, a non-transitory computer readable medium, a computer program product, a machine readable medium. In some but not necessarily all examples, the computer program instructions may be distributed over more than one computer program.

Although the memory 304 is illustrated as a single component/circuitry it may be implemented as one or more separate components/circuitry some or all of which may be integrated/removable and/or may provide permanent/semi-permanent/dynamic/cached storage.

Although the processor 302 is illustrated as a single component/circuitry it may be implemented as one or more separate components/circuitry some or all of which may be integrated/removable. The processor 302 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and I hardware circuit(s) and or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The apparatus 10 can, for example, be a portable electronic device (for example, a mobile cellular telephone, a smartphone, a tablet computer, a laptop computer, a personal digital assistant or a hand-held computer), a non-portable electronic device (for example, a personal computer or a base station), a portable multimedia device (for example, a music player, a video player, a game console and so on) or a module for such devices. The electronic device 200 can comprise radio frequency circuitry configured to transmit and/or receive radio frequency signals via the array 20 of dual-polarized antenna elements 22. As described above the apparatus 10 comprises one or more couplers 30. The apparatus 10 also comprises control circuitry 40, measurement circuitry 50, and calibration circuitry 60 which can be the same circuitry, for example a controller 300, or different circuitry.

The blocks illustrated in the drawings may represent steps in a method and/or sections of code in the computer program 306. The illustration of a particular order to the blocks does not necessarily imply that there is a required or preferred order for the blocks and the order and arrangement of the block may be varied. Furthermore, it may be possible for some blocks to be omitted.

The examples described above have particular application to mmWave (FR2) Devices supporting MIMO and especially UL-MiMo in 3GPP. These operate in the frequency range 24.25 GHz to 52.6 GHz, but not limited to these frequency ranges. For UL-MIMO a narrow 3D radiation beamwidth is expected at both the gNB and the UE and this can be achieved using phased array beam steering in accordance with the above examples.

The coherency requirements for UL MiMo specified by 3GPP (TS 38.101-2, Table 6.4D.4-1) and the beam alignment procedure between the UE and the gNB as described in 3GPP TR 38.802 section 6.1.6 and in TS 38.214 section 5.2

The coherency requirements for UL MiMo specified by 3GPP (TS 38.101-2, Table 6.4D.4-1) are shown below.

| Difference of relative phase error | Difference of relative power error | Time window |
|---|---|---|
| 40 degrees | 4 dB | 20 msec |

This table shows the maximum allowable difference between the measured relative power and phase and the expected relative power and phase, between different antenna array polarizations in any slot within the specified time window from the last transmitted SRS on the same antenna ports.

Optimal UL MiMo performance requires that the UL MiMo reference signals (SRS) are transmitted at the same time (coherent) at the UE to get the correct characterization of the current channel conditions. The nature of the phased array, both the electrical induced coupling changes and the physical structure of the array including routing of the signals will result in a dynamic coherent behavior between the transmitted signals, that is dynamically compensated as described above. The dynamic coherent behavior can be a result of beam configuration, power level, Modulation and Coding Scheme (MC S) and/or frequency.

The use of the above-described procedures can be tested in a device by artificially changing the coupling between antenna elements and then seeing if the beam changes after calibration. The coupling between antenna elements can be changed by applying a powerful jamming signal. The jamming signal is only applied when the UE is scheduled for SRS transmission. The required jamming power level will depend on the configured power level at the UE and the distance between the jamming antenna and the UE.

Where a structural feature has been described, it may be replaced by means for performing one or more of the functions of the structural feature whether that function or those functions are explicitly or implicitly described.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

It this document reference is made to "near field". Although this is considered to be a well-known technical term of art, further explanation and definition is given below.

An antenna has an electromagnetic (EM) field which surrounds it, and these EM fields change dependent on their distance from the antenna. Three regions are defined by the IEEE Standard Definition of Terms for Antennas: (a) Reactive Near Field, (b) Radiating Near Field, and (c) Far Field. An antenna will have a largest dimension D and a wavelength of radiation X. The Reactive Near Field is defined as "that region of the field immediately surrounding the antenna wherein the reactive field predominates", and in this case the field region extends from the antenna surface to an outer boundary:

$$R < 0.62\sqrt{\left(\frac{D^3}{\lambda}\right)},$$

where D>λ. The Radiating Near Field is defined as "that region of the field of an antenna between the reactive near field region and the far field region wherein radiation fields predominate and wherein the angular field distribution is dependent upon the distance from the antenna. For an antenna focused at infinity, the radiating near field region is sometimes referred to as the Fresnel region on the basis of analogy to optical terminology. If the antenna has a maximum overall dimension which is very small compared to the wavelength, this field region may not exist." The Radiating Near Field region is usually within the following limits:

$$0.62\sqrt{\frac{D^3}{\lambda}} \le R \le \frac{2D^2}{\lambda},$$

where D>λ. The Far Field is defined as "that region of the field of an antenna where the angular field distribution is essentially independent of the distance from the antenna. For an antenna focused at infinity, the Far Field region is sometimes referred to as the Fraunhofer region on the basis of analogy to optical terminology. "The Far Field region is usually within the following limits: $2D^2/\lambda \le R \le \infty$, where D>λ."

The term 'near field' includes the Reactive Near Field and the Radiating Near Field but excludes the Far Field.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The term 'and/or' means 'and' or 'or'. If a thing is configured to perform A and/or B it means that it can optionally perform A, it can optionally perform B, it can optionally perform A and B. In an example it could be configured to perform only A. In an example it could be configured to perform only B. In an example it could be configured to perform only A and B. In an example it could be configured to perform optionally one of A and B. In an example it could be configured to perform optionally one or more of A and B.

The term 'and/or' can therefore be replaced with wording based on one or more of these examples.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising:

an array of dual-polarized antenna elements wherein each dual-polarized antenna element comprises:
 a pair of orthogonal polarization feeds, and
 a coupler configured to couple, in the near field, the orthogonal polarizations;

control circuitry configured to control, for each polarization, for each dual-polarized antenna element, a power adjustment and/or a phase adjustment applied to signals of the respective polarization feeds of the respective dual-polarized antenna element;

measurement circuitry configured to measure, for each polarization, for each dual-polarized antenna element via its respective coupler, a power and/or a phase of a signal transmitted from the respective dual-polarized antenna array; and calibration circuitry configured to calibrate the control circuitry, wherein the calibration circuitry is configured to adjust, for each polarization, for each dual-polarized antenna element, the power adjustment and/or the phase adjustment applied to signals of the respective polarization feeds of the respective dual-polarized antenna element in dependence upon the measurement, for each polarization, of power and/or phase of the signal transmitted from the respective dual-polarized antenna element, wherein:

(i) a coupling between respective dual-polarized antenna elements of the array is configured based upon modifications to test the power adjustment and/or the phase adjustment applied to signals of the respective polarization feeds of the respective dual-polarized antenna element, (ii) the coupling is configured based upon modifications attributable to applying a jamming signal using a jamming antenna of the array of dual-polarized antenna elements, responsive to a user equipment (UE) being scheduled for Sounding Reference Signals (SRS) transmission, (iii) a power level of the jamming signal is dependent on a configured power level at the UE and a distance between the jamming antenna and the UE, and (iv) the control circuitry, the measurement circuitry and the calibration circuitry form a closed control loop that is configured to iterate to continually improve a similarity between the measured power or measured phase at transmission to an expected value of power or an expected value of phase at transmission for a particular beam direction associated with the signal transmitted from the respective dual-polarized antenna array until the similarity satisfies a threshold.

2. An apparatus as claimed in claim 1, wherein the closed control loop is configured to calibrate a dual-polarized beam formation using the array of dual-polarized antenna elements.

3. An apparatus as claimed in claim 1, wherein the control circuitry is configured to control, for each polarization, for each dual-polarized antenna element, a power adjustment and/or a phase adjustment applied to the respective polarization feeds of the respective dual-polarized antenna element to control a first direction of a beam formed by the array; and wherein the calibration circuitry is configured to adjust, for each polarization, for each dual-polarized antenna element, the power adjustment and/or the phase adjustment associated with the respective dual-polarized antenna element for forming a beam in the first direction.

4. An apparatus as claimed in claim 1, wherein the control circuitry is configured to control, for each polarization, for each dual-polarized antenna element, a power adjustment and/or a phase adjustment applied to the respective polarization feeds of the respective dual-polarized antenna element to control a first direction of a beam formed by the array; and wherein the calibration circuitry is configured to adjust, for each polarization, for each dual-polarized antenna element, the power adjustment and/or the phase adjustment associated with the respective dual-polarized antenna element for forming a beam in a second direction different to the first direction.

5. An apparatus as claimed in claim 1, wherein the calibration circuitry configured to calibrate the control circuitry is configured to adjust, for each polarization, for each dual-polarized antenna element, the power adjustment and/or the phase adjustment associated with the respective dual-polarized antenna element to control a direction of an uplink beam of the array.

6. An apparatus as claimed in claim 5, wherein the calibration circuitry configured to determine and store parameters used to calibrate the control circuitry to adjust, for each polarization, for each dual-polarized antenna element, the power adjustment and/or the phase adjustment associated with the respective dual-polarized antenna element to control a direction of an uplink beam of the array, wherein the stored parameters are used to calibrate the control circuitry to adjust, for each polarization, for each dual-polarized antenna element, the power adjustment and/or the phase adjustment associated with the respective dual-polarized antenna element to control a direction of a downlink beam of the array.

7. An apparatus as claimed in claim 1, wherein the pair of orthogonal polarization feeds have reflection symmetry in a virtual line and wherein the coupler is positioned on the virtual line.

8. An apparatus as claimed in claim 1, wherein each dual-polarized antenna element comprises a single coupler connected to the measurement circuitry by a single shared conductive path.

9. An apparatus as claimed in claim 1, wherein the signal comprises orthogonal signals applied to respective polarization feeds of respective dual-polarized antenna elements or the signal is a sounding reference signal.

10. An apparatus as claimed in claim 9, wherein the measurement circuitry is configured to measure synchronously, for each polarization, for each dual-polarized antenna element via its respective coupler, a power and/or a phase of the signal transmitted from the respective dual-polarized antenna element.

11. An apparatus as claimed in claim 8, wherein the measurement circuitry is configured to measure asynchronously, for each used polarization, for each dual-polarized antenna element via its respective coupler, a power and/or a phase of the signal transmitted from the respective dual-polarized antenna element.

12. An apparatus as claimed in claim 11, wherein the signal comprises time-separated signals applied to respective polarization feeds of respective dual-polarized antenna elements.

13. An apparatus as claimed in claim 1, wherein the calibration circuitry is configured to determine a delta phase value for each dual-polarized antenna element, for each respective polarization, the calibration circuitry being configured to compare:

an expected phase of the signal transmitted via the respective polarization feed with a measured phase of the signal transmitted via the respective polarization feed, wherein the expected phase of the signal transmitted via the respective polarization feed depends on the phase adjustment applied to the signal transmitted via the respective polarization feed; and the calibration circuitry being configured to cause compensation for at least the largest delta phase value.

14. An apparatus as claimed in claim 1, wherein the apparatus is a portable electronic device.

15. A non-transitory computer-readable storage medium storing a computer program that when run on one or more processors causes:

adjusting, for each polarization, for each dual-polarized antenna element in an array, a power adjustment and/or a phase adjustment applied to Sounding Reference Signals (SRS) of respective polarization feeds of respective dual-polarized antenna elements in dependence upon a coupler measurement, for each polarization, of power and/or phase of a particular SRS transmitted from the respective dual-polarized antenna element; and modifying a coupling between respective dual-polarized antenna elements in the array to test the power adjustment and/or the phase adjustment applied to SRS signals of the respective polarization feeds of the respective dual-polarized antenna element, wherein (i) modifying the coupling comprises applying a jamming signal using a jamming antenna of the array of dual-polarized antenna elements, responsive to a user equipment (UE) being scheduled for SRS transmission and (ii) a power level of the jamming signal is dependent on a configured power level at the UE and a distance between the jamming antenna and the UE.

16. A method for transmitting or receiving dual polarized signals using dual-polarized antenna elements of an array of dual-polarized antenna elements comprising:

for each polarization, of each dual-polarized antenna element of the array of dual-polarized antenna elements comprising a plurality of couplers:

transmitting a signal;

measuring via a coupler, of the plurality of couplers, associated with the respective dual-polarized antenna element a power and/or a phase of the transmitted signal, wherein respective ones of the plurality of couplers comprise a different size;

modifying a coupling between respective dual-polarized antenna elements of the array to test the power adjustment and/or the phase adjustment, wherein (i) modifying the coupling comprises applying a jamming signal using a jamming antenna of the array of dual-polarized antenna elements, responsive to a user equipment (UE) being scheduled for Sounding Reference Signals (SRS) transmission and (ii) a power level of the jamming signal is dependent on a configured power level at the UE and a distance between the jamming antenna and the UE; and transmitting or receiving a signal of the respective polarization of the respective dual-polarized antenna element using a power adjustment and/or a phase adjustment adjusted in dependence upon at least the transmitting coupler measurement.

17. A method as claimed in claim 16, further comprising:

controlling, for each polarization, for each dual-polarized antenna element, a power adjustment and/or a phase adjustment applied to the respective polarization feeds of the respective dual-polarized antenna element to control a first direction of a beam formed by the array; and adjusting, for each polarization, for each dual-polarized antenna element, the power adjustment and/or the phase adjustment associated with the respective dual-polarized antenna element for forming a beam in the first direction.

18. A method as claimed in claim 16, further comprising:

controlling, for each polarization, for each dual-polarized antenna element, a power adjustment and/or a phase adjustment applied to the respective polarization feeds of the respective dual-polarized antenna element to control a first direction of a beam formed by the array; and adjusting, for each polarization, for each dual-polarized antenna element, the power adjustment and/or the phase adjustment associated with the respective dual-polarized antenna element for forming a beam in a second direction different to the first direction.

19. A method as claimed in claim 16, further comprising adjusting, for each polarization, for each dual-polarized antenna element, the power adjustment and/or the phase adjustment associated with the respective dual-polarized antenna element to control a direction of an uplink beam of the array.

20. A method as claimed in claim 19, further comprising determining and storing parameters used to calibrate the control circuitry to adjust, for each polarization, for each dual-polarized antenna element, the power adjustment and/or the phase adjustment associated with the respective dual-polarized antenna element to control a direction of an uplink beam of the array, wherein the stored parameters are used for calibration to adjust, for each polarization, for each dual-polarized antenna element, the power adjustment and/ or the phase adjustment associated with the respective dual-polarized antenna element to control a direction of a downlink beam of the array.

* * * * *